(12) United States Patent
Alderson

(10) Patent No.: US 12,150,446 B2
(45) Date of Patent: Nov. 26, 2024

(54) C3-C6 N-ALKYL-GAMMA-BUTYROLACTAM- AND PEROYXGEN-CONTAINING ANTIMICROBIAL COMPOSITIONS

(71) Applicant: Diversey, Inc., Fort Mill, SC (US)

(72) Inventor: Faraz Alderson, Mississauga (CA)

(73) Assignee: DIVERSEY, INC, Fort Mill, SC (US)

( * ) Notice: Subject to any disclaimer, the term of this patent is extended or adjusted under 35 U.S.C. 154(b) by 712 days.

(21) Appl. No.: 17/291,343

(22) PCT Filed: Nov. 11, 2019

(86) PCT No.: PCT/IB2019/059671
§ 371 (c)(1),
(2) Date: May 5, 2021

(87) PCT Pub. No.: WO2020/100009
PCT Pub. Date: May 22, 2020

(65) Prior Publication Data
US 2022/0000108 A1    Jan. 6, 2022

Related U.S. Application Data

(60) Provisional application No. 62/758,792, filed on Nov. 12, 2018.

(51) Int. Cl.
| | | |
|---|---|---|
| A01N 43/08 | (2006.01) | |
| A01N 25/22 | (2006.01) | |
| A01N 25/30 | (2006.01) | |
| A01N 37/40 | (2006.01) | |
| A01N 59/00 | (2006.01) | |
| A01P 1/00 | (2006.01) | |

(52) U.S. Cl.
CPC ............ *A01N 43/08* (2013.01); *A01N 25/22* (2013.01); *A01N 25/30* (2013.01); *A01N 37/40* (2013.01); *A01N 59/00* (2013.01); *A01P 1/00* (2021.08)

(58) Field of Classification Search
CPC ........ A01N 43/08; A01N 25/22; A01N 25/30; A01N 37/40; A01N 59/00; A01N 43/36
See application file for complete search history.

(56) References Cited

U.S. PATENT DOCUMENTS

| 4,132,781 A | 1/1979 | Stoughton |
|---|---|---|
| 4,394,369 A | 7/1983 | Ranbom |
| 5,035,859 A | 7/1991 | Gu et al. |
| 5,130,124 A | 7/1992 | Merianos et al. |
| 5,523,012 A | 6/1996 | Winterton et al. |
| 5,972,237 A | 10/1999 | Muller et al. |
| 2014/0004208 A1 | 1/2014 | Golden et al. |

FOREIGN PATENT DOCUMENTS

| GB | 1525120 A | 9/1978 | |
|---|---|---|---|
| JP | 03161309 H | 7/1991 | |
| WO | WO-9602624 A1 * | 2/1996 | ............ A01N 59/00 |
| WO | 2004074417 A1 | 9/2004 | |

OTHER PUBLICATIONS

International Search Report and Written Opinion of PCT/IB2019/059671 mailed Jan. 14, 2020; 8 pages.

* cited by examiner

*Primary Examiner* — Robert A Wax
*Assistant Examiner* — Quanglong N Truong
(74) *Attorney, Agent, or Firm* — LORENZ & KOPF, LLP

(57) ABSTRACT

The use of a C3-C6 N-alkyl-gamma-butyrolactam, e.g. N-butyl-gamma-butyrolactam, to enhance the antimicrobial activity and/or stability of a peroxygen compound (e.g. hydrogen peroxide) in solution, and related compositions and methods. An example antimicrobial composition includes (a) at least one peroxygen compound; (b) at least one C3-C6 N-alkyl-gamma-butyrolactam; and (c) optionally, water, q.s. to 100.

20 Claims, No Drawings

C3-C6 N-ALKYL-GAMMA-BUTYROLACTAM- AND PEROYXGEN-CONTAINING ANTIMICROBIAL COMPOSITIONS

This application is a National Phase of PCT International Application No. PCT/IB2019/059671. filed Nov. 11, 2019. which claims the benefit of, and priority from, U.S. provisional application No. 62/758,792 filed on Nov. 12, 2018; the entire contents of both patent applications are incorporated herein by reference.

FIELD

The present specification relates to antimicrobial compositions for use in sanitization, disinfection and/or sterilization and, more particularly, compositions containing at least one peroxygen compound.

BACKGROUND

There is an ongoing effort to develop antimicrobial formulations that are effective against microorganisms, low in toxicity to humans and other animals, and not harmful to the environment.

Peroxygen-based antimicrobial solutions such as hydrogen peroxide solutions are known to have a broad spectrum of activity and favourable environmental profile. Broad spectrum activity is important in situations where harmful organisms are present but their identity is not known. However, one difficulty in formulating antimicrobial solutions based on peroxygen compounds is the length of time needed to reduce the bacterial count after application to a contaminated material. For example, it may take 30 minutes or more for the microbial load to be reduced to the desired level. In most circumstances, this rate of disinfection is unsatisfactory.

Peroxygen compounds can be unstable and decompose over time. For example, with respect to hydrogen peroxide, steps must be taken to stabilize the hydrogen peroxide if it is to be stored for any length of time. Various ways have been proposed to improve the stability of hydrogen peroxide compositions. For example, sodium stannate, sodium nitrate, and diethylene triamine penta(methylenephosphonic acid) have been reported as being useful as stabilizers, as disclosed in U.S. Pat. No. 5,523,012 to Winterton et al., which issued Jun. 4, 1996.

A number of compounds have been proposed purporting to boost the antimicrobial activity of hydrogen peroxide and/or to stabilize peroxygen based solutions. That said, the present specification is intended to meet the need for new and improved antimicrobial compositions employing a peroxygen compound wherein the stability and/or antimicrobial activity of the compound is enhanced, and wherein the compositions are safe to the environment, have a broad spectrum of activity, provide acceptable antimicrobial contact times and/or have an adequate shelf-life.

N-alkyl-gamma-butyrolactams (also known as N-alkyl pyrrolidones or alkyl pyrrolidones) are known to be solvents or nonionic surfactants. C1 and C2 N-alkyl-gamma-butyrolactams (also referred to as N-methylpyrrolidone or NMP and N-ethylpyrrolidone or NEP, respectively) are solvents which are toxic to mammals. According to the manufacturer data, C3-C6 N-alkyl-gamma-butyrolactams, more specifically N-butyl-gamma-butyrolactam (TamiSolve™ NxG), are not known as mammalian toxins and can be used as safer replacements for NMP and NEP. The C3-C6 N-alkyl-gamma-butyrolactams provide a good solvency for a wide range of compounds and have a high chemical and thermal stability. In addition to be solvents, these compounds are used in specialty polymer coatings (wire enamels & coated cooking gear), micro-electronics manufacturing (photoresist stripper), coatings (PUD's), paint strippers and inks, chemical synthesis and agrochemical formulations. C7 to C20 N-alkyl-gamma-butyrolactams such as octyl-gamma-butyrolactam (trade name: Surfadone™ LP-100) are non-ionic surfactants that have limited solubility in water due to the length of their alkyl chains.

SUMMARY

Surprisingly, the inventor has found that C3-C6 N-alkyl-gamma-butyrolactams, including N-butyl-gamma-butyrolactam, boost the antimicrobial activity of peroxygen compounds (e.g. hydrogen peroxide) in a synergistic manner and also function to stabilize these compounds in solution. They can therefore be used in sanitizing, disinfecting and sterilizing compositions containing peroxygen compounds to enhance the antimicrobial efficacy and stability of the compositions.

Thus, in accordance with a first aspect, the specification provides at least one C3-C6 N-alkyl-gamma-butyrolactam for use in enhancing the antimicrobial activity and/or stability of a peroxygen compound in solution. Similarly, also provided are the use of at least one C3-C6 N-alkyl-gamma-butyrolactam in enhancing the antimicrobial activity and/or stability of a peroxygen compound in solution, and a method of enhancing the antimicrobial activity and/or stability of a peroxygen compound in solution, wherein the method comprises combining at least one compound selected from the group consisting of C3-C6 N-alkyl-gamma-butyrolactams with the peroxygen compound.

According to another aspect, the specification provides an antimicrobial composition comprising, consisting essentially of, or consisting of:
 (a) at least one peroxygen compound (e.g. hydrogen peroxide);
 (b) at least one C3-C6 N-alkyl-gamma-butyrolactam (e.g. N-butyl-gamma-butyrolactam); and
 (c) optionally, water, q.s. to 100.

In some embodiments, the peroxygen compound can be present in a concentration of from about 0.01, 0.1, 0.5, 1.0, 1.5, 2.0, 2.5, 3.0, 3.5, 4.0, or 4.5 wt. % and up to about 40, 30, 20, 10, or 5 wt. %.

The C3-C6 N-alkyl-gamma-butyrolactam can be present in a concentration of from about 0.1, 0.5, 1.0, 1.5, 2.0, 2.5, 3.0, 3.5, 4.0, 4.5, or 5 wt. % and up to about 99.9, 90, 80, 70, 60, 50, 40, 30, 20, 15, 12, 10, 8, 7, or 6 wt. %.

The present inventive compositions preferably include an effective amount of at least one additional ingredient selected from the group comprising or consisting of chelating agents, pH adjusting agents, buffering agents, additional solvents, peroxygen stabilizing agents, additional antimicrobial agents, nonionic surfactants, anionic surfactants, amphoteric surfactants, cationic surfactants, hydrotropes, skin conditioning agents, anti-foaming agents, builders, soil suspenders and anti-redeposition agents, brightening agents, radical scavengers, dyes, fragrances, rheology modifiers, corrosion inhibitors, softening agents, anti-static agents, anti-wrinkling agents, dye transfer inhibition/color protection agents, odor removal/odor capturing agents, preservatives, soil shielding/soil releasing agents, ultraviolet light protection agents, water repellency agents, insect repellency agents, anti-pilling agents, souring agents, mildew removing agents, film-forming agents, plasticizers, and allergicides.

The additional antimicrobial agent can be chosen from the group comprising or consisting of aromatic and non-aromatic carboxylic acids (including cyclic carboxylic acids), alcohols, quaternary ammonium compounds, phenols, aldehydes, biguanides, mineral acids, halogen compounds, glycerol ethers, and antimicrobial metals such as copper.

In some embodiments, the composition can be present in concentrated form to be diluted by the end user in a ratio such as 1:16, 1:32, 1:64, 1:128, or 1:256 (composition: water).

According to yet another aspect, the invention provides a method reducing the microbial load of a surface by at least 50%, the method comprising applying a composition according to the present specification to the surface for up to 10 minutes at a temperature ranging from about −20° C. to about 80° C. and at an atmospheric pressure of from about 0 PSI to about 50 PSI units. The contact time can range from 10, 30, 45, or 60 seconds and up to 10, 5, 4, 3, 2, or 1 minute. Embodiments of the present compositions can provide even greater levels of microbial reduction, as shown in the below examples.

Examples of microorganisms against which the present composition can be effective include bacteria, viruses, fungi, yeasts, mycobacteria, fungal and bacterial spores, protozoa, parasites virinos, viroids, phages, prions, and combinations thereof.

The composition can be used on surfaces such as hard and soft surfaces, including without limitation, skin, fur, instruments, machinery, apparatus, equipment, health care surfaces, food processing surfaces, plants, plant products, food products, meat products, poultry, poultry debris, wares, agricultural objects, veterinary objects, and soil.

DETAILED DESCRIPTION

For the sake of clarity and to avoid ambiguity, certain terms are defined herein as follows.

The term "comprising" means "including without limitation." Thus, a composition comprising a list of ingredients may include additional ingredients not expressly recited. The term "consisting of" means "including the listed ingredients and such additional ingredients as can be present in the listed ingredients as natural or commercial impurities or additives." Natural and commercial impurities and additives will be apparent to the person of ordinary skill in the art. For example, commercial hydrogen peroxide solutions contain minute quantities of hydrogen peroxide stabilizers. The term "consisting essentially of" means "consisting of" the listed ingredients (as defined herein) and additional ingredients that would not materially affect the "basic and novel properties" of the composition. By "basic and novel properties" is meant the ability of the antimicrobial composition to reduce the microbial load on a surface to be sanitized, disinfected or sterilized. A change in efficacy (positively or negatively) of greater than 0.5 log using ASTM E2197-02 test method against S. aureus, at a contact time of up to about 5 minutes, at 20-25° C., is deemed herein to constitute a material effect.

The term "weight percent," "wt. %," "percent by weight," "% by weight," "wt. %," and variations thereof, refer to the concentration of a substance as the weight of that substance divided by the total weight of the composition containing that substance, and multiplied by 100.

The term "about" refers to variations in an expressed numerical quantity that can occur, for example, through measuring and liquid handling procedures used for making concentrates or ready-to-use (RTU) solutions in the real world, differences in the manufacture, source, or purity of the ingredients used to make the compositions or carry out procedures, and differences due to different equilibrium conditions or different reaction levels for a composition resulting from an initial mixture. For the sake of clarity, the term "about" includes variations in the expressed value of ±5%. Whether a value is modified by the term "about," the claims include equivalents to the values.

When used herein, the term "effective amount" means an amount that would bring about the desired effect, based on the purpose and function of the ingredient and composition in which the ingredient is used. What constitutes an effective amount will be determinable by the person of ordinary skill in the art without having to engage in inventive experimentation. For example, an effective amount of a pH adjusting agent is that amount which would cause the pH of the solution to reach the expressed value or ranges described and claimed herein.

In the description and claims, the singular forms "a," "an," and "the" include plural referents unless the context clearly dictates otherwise. Thus, for example, reference to a composition containing "a compound" includes a composition having two or more compounds. Reference to a C3-C6 N-alkyl-gamma-butyrolactam, includes reference to at least one compound selected from the group consisting of C3-C6 N-alkyl-gamma-butyrolactams. Reference to a composition includes reference to compositions. It should also be noted that the term "or" is generally employed in the sense of "and/or" unless the context clearly dictates otherwise.

The ranges of values recited herein are intended to include all values within the ranges. Thus, for example, a range of 0.01 to 4.5 wt. % is intended to include values such as 0.02, 0.03, 0.04, 0.05, 0.06, . . . 4.1, 4.2, 4.3, 4.4, etc., wt. %.

The term "microbial load" means the amount of microorganisms present on a surface to be disinfected. As used herein, the term "microorganism" refers to any non-cellular or unicellular (including colonial) organism. Microorganisms include all prokaryotes. Microorganisms include bacteria (including cyanobacteria), spores, lichens, fungi, protozoa, virinos, viroids, viruses, phages, prions, and some algae. As used herein, the term "microbe" is synonymous with microorganism.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready-to-eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the phrase "plant" or "plant product" includes any plant substance or plant-derived substance. Plant products include, but are not limited to, seeds, nuts, nut meats, cut flowers, plants or crops grown or stored in a greenhouse, house plants, and the like. Plant products include many animal feeds.

As used herein, the phrase "meat product" refers to all forms of animal flesh, including the carcass, muscle, fat, organs, skin, bones and body fluids and like components that form the animal. Animal flesh includes, but is not limited to, the flesh of mammals, birds, fishes, reptiles, amphibians, snails, clams, crustaceans, other edible species such as lobster, crab, etc., or other forms of seafood. The forms of animal flesh include, for example, the whole or part of animal flesh, alone or in combination with other ingredients. Typical forms include, for example, processed meats such as cured meats, sectioned and formed products, minced products, finely chopped products, ground meat and products including ground meat, whole products, and the like.

As used herein, the term "poultry" refers to all forms of any bird kept, harvested, or domesticated for meat or eggs, and including chicken, turkey, ostrich, game hen, squab, guinea fowl, pheasant, quail, duck, goose, emu, or the like and the eggs of these birds. Poultry includes whole, sectioned, processed, cooked or raw poultry, and encompasses all forms of poultry flesh, by-products, and side products. The flesh of poultry includes muscle, fat, organs, skin, bones and body fluids and like components that form the animal. Forms of animal flesh include, for example, the whole or part of animal flesh, alone or in combination with other ingredients. Typical forms include, for example, processed poultry meat, such as cured poultry meat, sectioned and formed products, minced products, finely chopped products and whole products.

As used herein, the phrase "poultry debris" refers to any debris, residue, material, dirt, offal, poultry part, poultry waste, poultry viscera, poultry organ, fragments or combinations of such materials, and the like removed from a poultry carcass or portion during processing and that enters a waste stream.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, auto dish sanitizers, sanitizing gels, cooling towers, food processing antimicrobial garment sprays, and non-to-low-aqueous food preparation lubricants, oils, and rinse additives.

As used herein, the term "ware" refers to items such as eating and cooking utensils, dishes, and other hard surfaces such as showers, sinks, toilets, bathtubs, countertops, windows, mirrors, transportation vehicles, and floors. Ware also refers to items made of plastic. Types of plastics that can be disinfected with the compositions according to the invention include but are not limited to, those that include polycarbonate polymers (PC), acrilonitrile-butadiene-styrene polymers (ABS), and polysulfone polymers (PS). Another exemplary plastic that can be disinfected using the compounds and compositions of the invention include polyethylene terephthalate (PET).

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the term "instrument" refers to the medical and dental instruments, devices, tools, appliances, apparatus, and equipment used in medicine or dentistry. These various instruments, devices and equipment include, but are not limited to: diagnostic instruments, trays, pans, holders, racks, forceps, scissors, shears, saws (e.g. bone saws and their blades), hemostats, knives, chisels, rongeurs, files, nippers, drills, drill bits, rasps, burrs, spreaders, breakers, elevators, clamps, needle holders, carriers, clips, hooks, gouges, curettes, retractors, straightener, punches, extractors, scoops, keratomes, spatulas, expressers, trocars, dilators, cages, glassware, tubing, catheters, cannulas, plugs, stents, scopes (e.g., endoscopes, stethoscopes, and arthroscopes) and related equipment.

As used herein, "agricultural" or "veterinary" objects or surfaces include animal feeds, animal watering stations and enclosures, animal quarters, animal veterinarian clinics (e.g. surgical or treatment areas), animal surgical areas, and the like.

As used herein, the term "sanitizer" refers to an agent that reduces the number of bacterial contaminants to safe levels as judged by public health requirements. Sanitizers are defined herein as compositions that can provide at least a 99.9% reduction of live microbial cells (3-log order reduction). As used herein, the term "disinfectant" refers to an agent that reduces the number of bacterial contaminants to safer levels as judged by public health requirements. Disinfectants are defined herein to mean a composition that can provide at least a 99.999% reduction of live microbial cells (5-log order reduction). These reductions can be evaluated using a variety of different antimicrobial efficacy testing methods, as required by specific regulatory agencies such as Unites States Environmental Protection Agency and Health Canada.

As used herein, the term "alkyl" or "alkyl groups" refers to saturated or unsaturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonate, phosphine, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups can be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

The chemical structures herein are drawn according to the conventional standards known in the art. Thus, where an atom, such as a carbon atom, as drawn appears to have an unsatisfied valency, then that valency is assumed to be satisfied by a hydrogen atom, even though that hydrogen atom is not necessarily explicitly drawn. The structures of some of the compounds of this invention include stereogenic carbon atoms. It is to be understood that isomers arising from such asymmetry (e.g., all enantiomers and diastereomers) are included within the scope of this invention unless indicated otherwise. That is, unless otherwise stipulated, any chiral carbon center can be of either (R) or (S) stereochemistry. Such isomers can be obtained in substantially pure form by classical separation techniques and by stereochemically-controlled synthesis. Furthermore, alkenes can include either the E- or Z-geometry, where appropriate. In addition, the compounds of the present specification may exist in unsolvated as well as solvated forms with acceptable solvents such as water, propylene glycol, ethanol, and the like. In general, the solvated forms are considered equivalent to the unsolvated forms for the purposes of the present specification.

The present specification contemplates the possibility of omitting any components listed herein. The present specification further contemplates the omission of any components even though they are not expressly named as included or excluded from the invention.

Peroxygen Compounds

The present composition includes at least one peroxygen compound in an amount from about 0.01, 0.1, 0.5, 0.8, 1, 1.5, 2, 2.5, 3, 3.5, 4, or 4.5 wt. % and up to about 40, 30, 20, 18, 16, 14, 12, 10, 8, 7, 6, 5, 4.5, or 4 wt. %. The amount of the peroxygen compound will generally not be more than about 4.5 wt. % in ready-to-use solutions, and generally not less than about 2 wt. % in concentrated solutions.

When used herein, a "peroxygen compound" is a compound containing an oxygen-oxygen single bond or the peroxide anion:

Examples include alkali metal peroxides (e.g. sodium peroxide).

Also included are compounds that generate and release hydrogen peroxide when dissolved in aqueous solution (e.g. urea peroxide, perboric acid, sodium/potassium perborate, sodium persulfate, calcium peroxide, lithium peroxide, sodium peroxide, or other peroxides of alkali, alkaline earth, or transition group metals or salts thereof).

Still other examples are compounds according to the following formulas I and II:

Formula I

wherein R1 and R2 are independently a substituted or unsubstituted, branched or unbranched, saturated or unsaturated, cyclic or linear alkyl group. R1 and R2 can be connected to form a cyclic structure. Examples include dialkyl peroxides such as dibenzoyl peroxide, diacetyl peroxide, di(n-propyl) peroxydicarbonate, butyl peroxybenzoate, and many others commercially available, without limitation, under the brand name Luperox™. In certain cases, the R1 and R2 can be sulfur or phosphorus atoms (e.g. peroxidisulfuric acid).

Formula II

wherein R is H or a substituted or unsubstituted, branched or unbranched, saturated or unsaturated, cyclic or linear alkyl group. Examples include, without limitation, hydrogen peroxide, butyl hydroperoxide, ethylidene peroxide, and ethyl hydroperoxide. In certain cases, the R can be sulfur or phosphorus atoms (e.g. peroximonosulfuric acid).

Preferred peroxygen compounds are hydrogen peroxide, sodium peroxide, benzoyl peroxide, dibenzyl peroxides, percarbonates (e.g. sodium percarbonates, potassium percarbonates), peroxymonosulfuric acid, and peroxydisulfuric acid.

C3-C6 N-Alkyl-Gamma-Butyrolactams

The C3-C6 N-alkyl-gamma-butyrolactam family of compounds are according to the following formula:

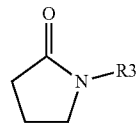

where R3 is a branched or unbranched, saturated or unsaturated, substituted or unsubstituted C3-C6 alkyl chain. Any one or more of a C3, C4, C5, and C6 N-alkyl-gamma-butyrolactam can be used. The at least one C3-C6 N-alkyl-gamma-butyrolactam can be present in a concentration of from about 0.01, 0.1, 0.25, 0.5, 1, 2.5, 5, 7, 9 or 10 wt. % and up to about 99.9, 90, 85, 80, 75, 70, 65, 60, 55, 50, 45, 40, 35, 30, 25, 20, 18, 16, 14 or 12 wt. %. The solvent will generally not be more than about 15 wt. % in ready-to-use solutions, or less than about 4 wt. % in concentrated solutions. Optimal use concentrations can differ if this class of compounds is used for the purpose of also stabilizing peroxygen compounds. For the purpose of stabilizing peroxygen compounds, these compounds can be present in a concentration from about 0.01, 0.05, 0.1, 0.2, 0.4, 0.5, 0.7, 1, 1.5, 2, 2.5, 3, 3.5, 4, 4.5, or 5 wt. % and up to about 12, 11.5, 11, 10.5, 10, 9.5, 9, 8.5, 8, 7.5, 7, 6.5, 6, or 5.5 wt. % in ready-to-use solutions. The concentration can be 2, 4, 8, 16, 32, or 64 times higher in concentrated solutions.

Optional Ingredients

The present inventive compositions preferably include an effective amount of at least one additional ingredient selected from the group comprising or consisting of chelating agents, pH adjusting agents, buffering agents, additional solvents, peroxygen stabilizing agents, additional antimicrobial agents, nonionic surfactants, anionic surfactants, amphoteric surfactants, cationic surfactants, hydrotropes, skin conditioning agents, anti-foaming agents, builders, soil suspenders and anti-redeposition agents, brightening agents, radical scavengers, dyes, fragrances, rheology modifiers, corrosion inhibitors, softening agents, anti-static agents, anti-wrinkling agents, dye transfer inhibition/color protection agents, odor removal/odor capturing agents, preservatives, soil shielding/soil releasing agents, ultraviolet light protection agents, water repellency agents, insect repellency agents, anti-pilling agents, souring agents, mildew removing agents, film-forming agents, plasticizers, and allergicides.

Additional Antimicrobial Agent

The additional antimicrobial agent can be chosen from the group comprising or consisting of inorganic or organic acids, alcohols, quaternary ammonium compounds, phenols, aldehydes, biguanides, mineral acids, halogen compounds, and antimicrobial metals such as copper, and mixtures thereof. Organic acids include carboxylic acids, including linear and cyclic carboxylic acids.

When used, the concentration of the antimicrobial compound can be from about 0.005, 0.1, 1, 5, 10, or 20 wt. %, and up to about 50, 40, 30, 25, 15, 8, 3, or 0.5 wt. %.

Carboxylic Acids

In some embodiments, the compositions can comprise at least one cyclic or linear, branched or unbranched, saturated or unsaturated, substituted or unsubstituted, mono-, di- or poly-carboxylic acid or salt thereof. The carboxylic acid or salt can be chosen from C1 to C22 carboxylic acids and salts. In some embodiments, the carboxylic acid or salt can be a C5 to C11 carboxylic acid or salt. In some embodiments, the carboxylic acid or salt can be a C1 to C4 carboxylic acid or salt. Examples of suitable carboxylic acids and salts thereof include but are not limited to 2-furoic acid, salicylic acid, benzoic acid, citric acid, sulfosalicylic acid, sulfosuccinic acid, glycolic acid, lactic acid, formic acid, oxalic acid, malic acid, acetic acid, propionic acid, butanoic acid, pentanoic acid, hexanoic acid, heptanoic acid, octanoic acid, nonanoic acid, decanoic acid, undecanoic acid, dodecanoic acid, as well as their branched isomers, maleic acid, ascorbic acid, alpha-or-beta hydroxy-acetic acid, neopentanoic acid, neoheptanoic acid, neodecanoic acid, malonic acid, succinic acid, glutaric acid, adipic acid, pimelic acid, suberic acid, salts thereof and mixtures thereof. Some embodiments will have at least one acid and/or salt selected from the group consisting of salicylic acid, 2-furoic acid, benzoic acid, and salts thereof.

The acid and/or salt can be present in a concentration of from about 0.02, 0.05, 0.1, 0.5, or 1 wt. % and up to about 15, 13, 10, 8, 6, 4, or 3 wt. %. The acid and/or salt will generally not be higher than 8 wt. % in ready-to-use solutions, or lower than 1 wt. % in concentrated solutions.

Other Solvents

The present compositions can (optionally) contain at least one additional solvent to, for example, enhance cleaning and/or to help solubilize ingredients in the solution.

Exemplary additional solvents include cyclic alcohols (e.g. phenethyl alcohol, benzyl alcohol, phenoxyethanol, and cyclopentylmethanol), carbonates (e.g. ethylene carbonate, propylene carbonate, butylene carbonate, and glycerin carbonate), dimethyl succinate, benzyl acetate, benzyl benzoate, acetophenone, 2-acetyl-1-methylpyrrole, diester dicarboxylates (e.g., dibasic esters, such as dialkyl adipate, dialkyl glutarate, dialkyl succinate), dialkyl carbonate, organo-nitriles, phthalate esters, propylene glycol derivatives with ethoxylation and/or propoxylation, alkoxytriglycols and other glycols such as methoxytriglycol, ethoxytriglycol, butoxytriglycol, hexyltriglycol, propylene glycol methyl ether acetate, dipropylene glycol methyl ether acetate, dipropylene glycol n-butyl ether, propylene glycol n-butyl ether, dipropylene glycol n-propyl ether, propylene glycol n-propyl ether, dipropylene glycol methyl ether, tripropylene glycol methyl ether, methanol, ethanol, butyl 3-hydroxybutyrate, isopropyl alcohol, ethylhexylglycerol, branched or unbranched diols, charged or uncharged non-surfactant emulsifying agents, polar protic solvents, polar aprotic solvents, diethylene glycol monobutyl ether, diethylene glycol monoethyl ether, $C_1$-$C_8$ alcohols (e.g. methanol, ethanol, propanol, butanol, etc.) and mixtures thereof.

The additional solvent(s) can be present in a concentration of from about 0.01, 0.5, 1, 2.5, 5, 7, 9 or 10 wt. % and up to about 50, 40, 30, 20, 18, 16, or 14 wt. %. The additional solvent(s) will generally not be more than about 20 wt. % in ready-to-use solutions, or more than about 50 wt. % in concentrated solutions.

Peroxygen Stabilizing Agents

Peroxygen stabilizing agents can be included where stabilization or further stabilization of the peroxgen compounds is desired or necessary. These include 1-hydroxyethane-1, 1-diphosphonic acid (HEDP, also referred to herein as etidronic acid), ethylenediaminetetraacetic acid (EDTA), glutamic acid diacetic acid (GLDA), methylglycine diacetic acid (MGDA), polymandelic acid, diethylenetriaminepentaacetic acid (DTPA), N-(hydroxyethyl)-ethylenediaminetriacetic acid (HEDTA), nitrilotriacetic acid (NTA), 2-hydroxyethyliminodiacetic acid (HEIDA), benzoic acid, aminobenzoic acid, citric acid, iminodisuccinic acid, polyaspartic acid, phosphoric acid, tripolyphosphate, amino tri(methylene phosphonic acid) (ATMP), diethylenetriaminepenta(methylene phosphonic acid), 2-hydroxy ethylimino bis(methylene phosphonic acid), ethylene diamine tetra(methylene phosphonic acid), hexamethylenediaminetetra(methylene phosphonic) acid, and salts thereof. The skilled person will appreciate that certain of these peroxygen stabilizing agents are also classified as chelating agents (e.g. HEDP, EDTA, etc.).

When used, peroxygen stabilizing agents can be present in a concentration of from about 0.005, 0.1, 1, 2, 3, 4, 5, 7, or 10 wt. % and up to about 20, 17.5, 15, 12.5, 8.5, or 2.5 wt. %.

pH Adjusting and Buffering Agents

At least one pH adjusting agent and/or buffering agent can be included in an amount effective to adjust and/or keep the pH of the solution to within the pH ranges recited herein.

Examples include, without limitation, inorganic acids (e.g. phosphoric acid) and salts thereof, organic acids (e.g. citric acid, methane sulfonic acid, p-toluene sulfonic acid) and salts thereof, and alkaline agents (e.g. potassium hydroxide and sodium hydroxide).

In ready-to-use or concentrated embodiments, the pH can range from about 0.1, 1, 1.5, 2, 2.5, 3, 3.5, 4, 4.5, 5, 5.5, 6, 6.5, 7, 7.5, or 8, and up to about 12, 11.5, 11, 10.5, 10, 9.5, 9, or 8.5. In concentrated solutions, the pH can range from about 0 up to about 2.5, or from about 11 up to about 14.

The pH adjusting and/or buffering agents can be present in a total concentration of from about 0.01, 0.5, 1, 3, 5, or 7 wt. %, and up to about 15, 12, 10, 8, 6, 4, 2, 0.1, or 0.05 wt. %.

Nonionic Surfactants

Nonionic surfactants compatible with peroxygen compounds can be included to enhance the cleaning properties of the present solutions and/or to enhance solubility of ingredients contained therein.

Suitable nonionic surfactants include alkoxylated surfactants such as alkoxylates made from ethylene oxide (EO), propylene oxide (PO), and butylene oxide (BO). Suitable alkoxylated surfactants include homo or copolymers or terpolymers, capped EO/PO/BO copolymers, alcohol alkoxylates, capped alcohol alkoxylates, mixtures thereof, or the like. Suitable alkoxylated surfactants for use as solvents include EO/PO block copolymers, such as the Pluronic and reverse Pluronic surfactants; alcohol alkoxylates such as Dehypon LS-54, and Dehypon LS-36 capped alcohol alkoxylates, such as Plurafac LF221 and Tegoten EC11. More specifically, the composition of the present specification can include an alkoxylated primary or secondary alcohol having from 8 to 18 carbon atoms reacted with from 2 to 12 moles of ethylene, and/or propylene, and/or butylene oxide. In an embodiment, the nonionic surfactant has from 3 to 18 moles of alkylene oxide, in another embodiment from 3 to about 10 moles of ethylene oxide (EO), and in yet another embodiment about 7 moles of EO. Examples include lauryl alcohol ethoxylated with 3 moles of ethylene oxide (EO), coco alcohol ethoxylated with 3 moles EO, stearyl alcohol ethoxylated with 5 moles EO, mixed $C_{12}$-$C_{15}$ alcohol ethoxylated with 7 moles EO, mixed secondary $C_{11}$-$C_{15}$ alcohol ethoxylated with 7 moles EO, mixed $C_9$-$C_{11}$ linear alcohol ethoxylated with 6 moles EO and the like. In some embodiments, the nonionic surfactant can have from 8 to 15 carbon atoms in the alkyl group. In an embodiment, the composition comprises the alcohol alkoxylates, particularly the alcohol ethoxylates and propoxylates, especially the mixed ethoxylates and propoxylates, particularly with 3-7 oxyethylene (EO) units and 3-7 oxypropylene (PO) units such as the alcohol Dehypon™ available from Cognis Corporation, having 5 EO units and 4 PO units.

The semi-polar type of nonionic surface-active agents are another class of nonionic surfactant that may be useful in compositions of the present specification. Semi-polar nonionic surfactants include the amine oxides (e.g. tertiary amine oxides), phosphine oxides, sulfoxides and their alkoxylated derivatives.

Examples of amine oxide surfactants include those selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylamine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

When used, the concentration of the nonionic surfactant can be from about 0.02, 0.1, 1, 5, 10, or 20 wt. %, and up to about 30, 25, 15, 8, 3, or 0.5 wt. %.

Anionic Surfactants

Anionic surfactants that can be used in the present compositions include sulfates, such as alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, glucamine sulfates, and sulfates of alkylpolysaccharides such as the sulfates of alkylpolyglucoside, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants that can be used include alkyl sulfonates, the linear and branched primary and secondary alkyl sulfonates, sulfate esters, sulfonate esters, the aromatic sulfonates with or without substituents, including alkylbenzene sulfonates, and their salts.

Anionic carboxylate surfactants can also be used such as alkyl carboxylic acids (and salts), such as alkanoic acids (and alkanoates), ester carboxylic acids (e.g. alkyl succinates), ether carboxylic acids, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylglutamates, acyl peptides, taurates (e.g. N-acyl taurates and fatty acid amides of methyl tauride), and the like.

Preferred anionic surfactants include $C_6$-$C_{24}$ alkylbenzene sulfonates; alkyl sarcosines and their salts, $C_6$-$C_{24}$ olefin sulfonates, $C_6$-$C_{24}$ paraffin sulfonates, cumene sulfonate, xylene sulfonate; $C_6$-$C_{24}$ alcohol sulfates (preferably $C_6$-$C_{12}$ alcohol sulfates), and $C_6$-$C_{24}$ alcohol ether sulfates having 1 to about 20 ethylene oxide groups.

Other suitable anionic surfactants include alkyl phosphonates, alkyl ether phosphonates, alkyl phosphates, alkyl ether phosphates, and phosphate esters.

When used, the concentration of the anionic or nonionic surfactant(s) can be from about 0.02, 0.1, 0.2, 0.4, 0.8, 1, 2.5, 5, 6.5, 10, or 20 wt. %, and up to about 40, 30, 25, 20, 15, 8, 3, or 0.5 wt. %.

Hydrotropes

The solution or composition of the invention may include one or more hydrotropes for improving solubility and phase stability, such as salts of aryl and alkylaryl sulfonic acids such as xylene sulfonic acid, cumene sulfonic acid, and toluene sulfonic acid. Other hydrotropes include polyether phosphate esters, alkyl sulfates, alkyl and alkylaryl sulfonates, diphenyloxide disulfonates, and benzoic acid salts.

When used, the hydrotrope can be present in a concentration of from about 0.1, 1, 3, 5, 10, or 20 wt. % and up to about 25, 15, 8, 4, or 1.5 wt. %.

It will be appreciated that certain hydrotropes can also be categorized as anionic or nonionic surfactants. The skilled person will appreciate the various categories to which the same compound can belong.

Skin Conditioning Agents

In embodiments for use on skin, the solution may include an effective amount of at least one emollient, humectant or other skin conditioning agent, including but not limited to glycerin, polyglycerin, butylene glycol, glycerides, castor oil, allantoin, cationic polymers, lanolin and its derivatives, polyols and glycols such as glycerol, polyglycerol, sorbitol, mannitol, erythritol, xylitol, arabitol, ribitol, dulcitol, lactitol, maltitol, propylene glycol, hexylene glycol, ceramides, essential fatty acids such as linolenic acid, gamma-linolenic acid, linoleic acid, gamma-linoleic acid, tocopherols such as tocopheryl acetate, quaternised gums, quaternised polymers, glucose-ethers, vegetable oils, long chain fatty acids, long chain alcohols (e.g. cetyl alcohol), and phospholipids, and mineral oils.

When used, the skin conditioning agent can be present in a concentration of from about 0.01, 0.5, 2, 5, or 10 wt. %, and up to about 30, 25, 20, 15, 8, 4, or 1 wt. %.

Other Ingredients

The present compositions can also include other ingredients such as anti-foaming agents, e.g. siloxanes, low-solubility oils, and low-HLB nonionic surfactants, in a concentration of from about 0.001, 0.1, 0.5, 2, 4, 5, or 7 wt. %, and up to about 10, 8, 5, 4, or 3 wt. %.

Builders can be present in a concentration of from about 0.01, 0.5, 2, 4, or 5 wt. %, and up to about 8, 3, 1, or 0.1 wt. %.

Soil suspenders can be present in a concentration of from about 0.01, 0.5, 2, 5, or 10 wt. %, and up to about 15, 8, 4, 1, or 0.1 wt. %.

Brighteners can be present in a concentration of from about 0.0005, 0.05, 0.1, 2, or 7 wt. %, and up to about 10, 5, 3, 1, or 0.01 wt. %.

Radical scavengers can be present in a concentration of from about 0.005, 0.5, 1, or 5 wt. %, and up to about 15, 10, 3, 0.1, or 0.01 wt. %.

The following examples will help to illustrate the utility and novelty of the invention.

EXAMPLES

A number of solutions were prepared using the ingredients shown in Table A. The solutions are summarized in Tables 1-4 which list the amount of the raw material used to make the solutions. To calculate the actual concentration of the active in each solution, it is necessary to multiply the values provided in Tables 1-4 with the values in Table A and divide by 100. For example, in Table 1, the amount of hydrogen peroxide in Solutions C and D is 0.50 wt. % ((1.0×50)/100).

TABLE A

| Classification | Ingredient Identity (wt. % active)_Brand Name_Commercial Source |
|---|---|
| C3-C6 N-alkyl-gamma-butyrolactam | N-butyl-gamma-butyrolactam (>99.5 wt. % active)_TamiSolve ® NxG_Eastman Chemical Company |
| Anionic surfactant | C9-C14 alkyl benzenesulfonic acid (≥96 wt. % active)_Bio-Soft S-101_Stepan Company |
| Carboxylic Acid | Salicylic acid (≥99 wt. % active)_N/A_Sigma Aldrich |
| | 2-furoic acid (≥99 wt. % active)_N/A_Swadev Chemicals |
| Peroxygen Source | Hydrogen Peroxide (50 wt. % active)_Peroxal 50 BIO_Arkema |
| Chelating Agent | Etidronic acid (60 wt. % active)_Dequest 2010_Italmatch Chemicals |

TABLE 1

| INGREDIENT | A wt. % | B wt. % | C wt. % | D wt. % |
|---|---|---|---|---|
| Peroxal 50 BIO | — | — | 1.0 | 1.0 |
| TamiSolve NxG | 4 | 7 | — | 7 |
| Deionized water | q.s. to 100 | q.s. to 100 | q.s. to 100 | q.s. to 100 |
| Log Base Ten Reduction of M. smegmatis, 5 mins contact time | 1.23 | 1.61 | 0.42 | 5.5 |

Solutions A, B, C and D were prepared as shown above and tested according to the ASTM E2197-02 test method, with soil load, against mycobacteria (*M. smegmatis*). The results are shown in the last row of Table 1. Solution D, containing a combination of hydrogen peroxide and the N-butyl-gamma-butyrolactam, was surprisingly more effective than Solutions A, B, and C, which contained only one of these two compounds. These results show that N-butyl-gamma-butyrolactam synergistically enhances the antimicrobial activity of the hydrogen peroxide in solution.

TABLE 2

| INGREDIENT | E wt. % | F wt. % |
|---|---|---|
| BIOSOFT S-101 | | 0.2 |
| Dequest 2010 | | 0.05 |
| Peroxal 50 BIO | 1.0 | |
| TamiSolve NxG | — | 4 |
| Deionized water | q.s. to 100 | q.s. to 100 |
| Log Base Ten Reduction of S. aureus, 3 mins contact time | 1.09 | 4.83 |

TABLE 2-continued

| INGREDIENT | E wt. % | F wt. % |
|---|---|---|
| Log Base Ten Reduction - M. smegmatis, 5 mins contact time | 0.4 | 4.12 |
| Log Base Ten Reduction - M. terrae, 5 mins contact time | 0.84 | 2.5 |

Solutions E and F were prepared and tested according to the ASTM E2197-02 test method, with soil load, against Gram positive bacteria (S. aureus) and mycobacteria (M. smegmatis and M. terrae). The results in the last three rows show that Solution F, which contains the same ingredients as Solution E, plus 4 wt. % N-butyl-gamma-butyrolactam was significantly more effective than Solution E against all test organisms.

TABLE 3

| INGREDIENT | G wt. % | H wt. % |
|---|---|---|
| BIOSOFT S-101 | 0.2 | |
| Dequest 2010 | 0.05 | |
| Peroxal 50 BIO | 1.0 | |
| Salicylic acid | 0.1 | |
| 2-furoic acid | 0.6 | |
| TamiSolve NxG | — | 4 |
| Deionized water | q.s. to 100 | q.s. to 100 |
| Log Base Ten Reduction of S. aureus, 1.5 mins contact time | 2.5 | 6.34 |
| Log Base Ten Reduction - M. smegmatis, 2.5 mins contact time | 3.6 | 4.5 |
| Log Base Ten Reduction - M. terrae, 2.5 mins contact time | 2.82 | 4.79 |

Solutions G and H were tested according to the ASTM E2197-02 test method, with soil load, against Gram positive bacteria (S. aureus) and mycobacteria (M. smegmatis and M. terrae). As shown above, the addition of the N-butyl-gamma-butyrolactam to Solution H caused it to significantly outperform Solution G against all test organisms.

TABLE 4

| INGREDIENT | I wt. % | J wt. % | K wt. % | L wt. % |
|---|---|---|---|---|
| BIOSOFT S-101 | 0.18 | | 7 | |
| Dequest 2010 | 0.05 | | 0.15 | |
| Peroxal 50 BIO | 1.0 | | 12.0 | |
| TamiSolve NxG | — | 1 | — | 1 |
| % Peroxide loss | 0.43 | 0.06 | 0.95 | 0.26 |

Solutions I, J, K and L were formulated to determine what effect the N-butyl-gamma-butyrolactam would have on the stability of hydrogen peroxide in solution. These solutions underwent accelerated aging by incubation at 54° C. for a period of two weeks. The hydrogen peroxide concentration was measured before and after the incubation period using the iodometric titration method, in which sodium thiosulfate was employed as the titrant. The results (comparing I with J; and K with L) show that the N-butyl-gamma-butyrolactam is surprisingly able to enhance the stability of hydrogen peroxide in solution.

Other Example Solutions

Additional solutions according to the invention were prepared and are summarized below. In these solutions, the concentrations shown below are actual active concentrations.

Disinfectant Concentrate
  Technical grade hydrogen peroxide (8 wt. %)
  N-butyl-gamma-butyrolactam (21.0 wt. %)
  etidronic acid (0.75 wt. %)
  mixture of C9-C14 alkyl benzenesulfonic acids (12.0 wt. %)
  deionized water (q.s. to 100)
Ready-to-use Topical Disinfectant Solution
  cosmetic grade hydrogen peroxide (0.5 wt. %)
  N-butyl-gamma-butyrolactam (4.5 wt. %)
  sodium capryloyl glutamate (2.0 wt. %)
  sodium cocoyl isethionate (2.0 wt. %)
  deionized water (q.s. to 100)
Food Contact Hard Surface Sanitizer
  food grade hydrogen peroxide (0.5 wt. %)
  N-butyl-gamma-butyrolactam (3.4 wt. %)
  laurylamine oxide (1.2 wt. %)
  deionized water (q.s. to 100)
Ready-to-use Hard Surface Disinfectant
  Technical grade hydrogen peroxide (0.8 wt. %)
  N-butyl-gamma-butyrolactam (5.0 wt. %)
  C8-C10 alkoxylated phosphate esters (0.6 wt. %)
  C9-C11 ethoxylated alcohols (0.15 wt. %)
  etidronic acid (0.4 wt. %)
  deionized water (q.s. to 100)
Antimicrobial Hand Soap Solution
  technical grade hydrogen peroxide (0.8 wt. %)
  N-butyl-gamma-butyrolactam (5.0 wt. %)
  capryleth-9 carboxylic acid (3.0 wt. %)
  disodium laureth sulfosuccinate (1.2 wt. %)
  ethanol (28.0 wt. %)
  salicylic acid (0.25 wt. %)
  deionized water (q.s. to 100)

The foregoing description of embodiments is by way of example only and is not intended to limit the scope of the invention as herein described and claimed.

The invention claimed is:

1. An antimicrobial composition, comprising:
   peroxygen compound in an amount of from about 0.5% to about 16% by weight;
   C3-C6 N-alkyl-gamma-butyrolactam in an amount of from about 1% to about 25% by weight, based on a total weight of the composition; and
   optionally at least one of the following ingredients: water, peroxygen stabilizing agent different from the C3-C6 N-alkyl-gamma-butyrolactam, anionic surfactant, nonionic surfactant, amphoteric surfactant, cationic surfactant, solvent, pH adjusting agent, chelating agent, buffering agent, hydrotrope, skin conditioning agent, antifoaming agent, additional antimicrobial agent, or any combination thereof.

2. The composition of claim 1, wherein the peroxygen compound is hydrogen peroxide.

3. The composition of claim 1, wherein the C3-C6 N-alkyl-gamma-butyrolactam comprises N-butyl-gamma-butyrolactam.

4. The composition of claim 1, wherein the additional antimicrobial agent comprises carboxylic acid, alcohol, quaternary ammonium compound, phenol, aldehyde, biguanide, mineral acid, halogen compound, glycerol ether, antimicrobial metal, or any combination thereof.

5. The composition of claim 4, wherein the additional antimicrobial agent comprises carboxylic acid.

6. The composition of claim 5, wherein the carboxylic acid is present in an amount of from about 0.02% to about 15% by weight based on total weight of the composition.

7. The composition of claim 5, wherein the carboxylic acid comprises a cyclic carboxylic acid.

8. The composition of claim 5, wherein the carboxylic acid comprises 2-furoic acid, salicylic acid, mandelic acid, benzoic acid, citric acid, sulfosalicylic acid, sulfosuccinic acid, glycolic acid, lactic acid, formic acid, oxalic acid, malic acid, acetic acid, propionic acid, butanoic acid, pentanoic acid, hexanoic acid, heptanoic acid, octanoic acid, nonanoic acid, decanoic acid, undecanoic acid, dodecanoic acid, maleic acid, ascorbic acid, alpha-or-beta hydroxy-acetic acid, neopentanoic acid, neoheptanoic acid, neodecanoic acid, malonic acid, succinic acid, glutaric acid, adipic acid, pimelic acid, suberic acid, or any mixture thereof.

9. The composition of claim 1, wherein the peroxygen stabilizing agent is present in an amount of from about 0.005% to about 20% by weight based on total weight of the composition.

10. The composition of claim 1, wherein the peroxygen stabilizing agent comprises 1-hydroxyethane-1,1-diphosphonic acid (HEDP), ethylenediaminetetraacetic acid (EDTA), glutamic acid diacetic acid (GLDA), methylglycine diacetic acid (MGDA), polymandelic acid, diethylenetriaminepentaacetic acid (DTPA), N-(hydroxyethyl)-ethylenediaminetriacetic acid (HEDTA), nitrilotriacetic acid (NTA), 2-hydroxyethyliminodiacetic acid (HEIDA), benzoic acid, aminobenzoic acid, citric acid, iminodisuccinic acid, polyaspartic acid, phosphoric acid, tripolyphosphate, amino tri(methylene phosphonic acid) (ATMP), diethylenetriaminepenta(methylene phosphonic acid), 2-hydroxy ethylimino bis(methylene phosphonic acid), ethylene diamine tetra(methylene phosphonic acid), hexamethylenediaminetetra(methylene phosphonic) acid, or any mixture thereof.

11. The composition of claim 1, wherein the anionic surfactant is present in an amount of from about 0.02% to about 40% by weight based on total weight of the composition.

12. The composition of claim 1, wherein the anionic surfactant comprises sulfate, sulfonate, carboxylate, alkyl phosphonate, alkyl ether phosphonate, alkyl phosphate, alkyl ether phosphate, phosphate ester, or any combination thereof.

13. The composition of claim 1, wherein the anionic surfactant comprises C6-C24 alkylbenzene sulfonate, alkyl sarcosinate, C6-C24 olefin sulfonate, C6-C24 paraffin sulfonate, cumene sulfonate, xylene sulfonate, C6-C24 alcohol sulfates, C6-C24 alcohol ether sulfates having 1 to about 20 ethylene oxide groups, or any mixture thereof.

14. The composition of claim 1, wherein the composition comprises the solvent that fulfills at least one of the following:
(a) the solvent is present in an amount of from about 0.01% to about 20% by weight based on total weight of the composition;
(b) the solvent comprises cyclic alcohol, carbonate, dimethyl succinate, benzyl acetate, benzyl benzoate, acetophenone, 2-acetyl-1-methylpyrrole, diester dicarboxylate, dialkyl carbonate, organo-nitrile, phthalate ester, propylene glycol derivative with ethoxylation and/or propoxylation, alkoxytriglycol, propylene glycol methyl ether acetate, dipropylene glycol methyl ether acetate, dipropylene glycol n-butyl ether, propylene glycol n-butyl ether, dipropylene glycol n-propyl ether, propylene glycol n-propyl ether, dipropylene glycol methyl ether, tripropylene glycol methyl ether, methanol, ethanol, butyl 3-hydroxybutyrate, isopropyl alcohol, ethylhexylglycerol, diols, non-surfactant emulsifying agent, polar protic solvent, polar aprotic solvent, diethylene glycol monobutyl ether, diethylene glycol monoethyl ether, C1-C8 alcohols, or any mixture thereof.

15. The composition of claim 1, wherein the composition comprises the pH adjusting agent that fulfills at least one of the following:
(a) the pH adjusting agent is present in an amount of from about 0.01% to about 15% by weight based on total weight of the composition;
(b) the pH adjusting agent comprises phosphoric acid or salt thereof, citric acid or salt thereof, methane sulfonic acid or salt thereof, p-toluene sulfonic acid or salt thereof, potassium hydroxide, sodium hydroxide, or any combination thereof.

16. The composition of claim 1, wherein the composition comprises nonionic surfactant that fulfills at least one of the following:
(a) the nonionic surfactant is present in an amount of from about 0.02% to about 30% by weight based on total weight of the composition;
(b) the nonionic surfactant comprises alkoxylated surfactant, amine oxides, phosphine oxides, sulfoxide, or any combination thereof.

17. An antimicrobial composition, comprising:
hydrogen peroxide in an amount of from about 0.5% to about 16% by weight;
C3-C6 N-alkyl-gamma-butyrolactam in an amount of from about 1% to about 25% by weight;
water;
optionally carboxylic acid or salt thereof in an amount of from about 0.02% to about 15% by weight;
optionally peroxygen stabilizing agent different from the C3-C6 N-alkyl-gamma-butyrolactam and present in an amount of from about 0.005% to about 20% by weight; and
optionally anionic surfactant in an amount of from about 0.02% to about 40% by weight based on total weight of the composition.

18. The antimicrobial composition of claim 17, wherein the composition fulfills at least one of the following:
(a) the C3-C6 N-alkyl-gamma-butyrolactam comprises N-butyl-gamma-butyrolactam;
(b) the carboxylic acid comprise 2-furoic acid, salicylic acid, mandelic acid, benzoic acid, citric acid, sulfosalicylic acid, sulfosuccinic acid, glycolic acid, lactic acid, formic acid, oxalic acid, malic acid, acetic acid, propionic acid, butanoic acid, pentanoic acid, hexanoic acid, heptanoic acid, octanoic acid, nonanoic acid, decanoic acid, undecanoic acid, dodecanoic acid, maleic acid, ascorbic acid, alpha-or-beta hydroxy-acetic acid, neopentanoic acid, neoheptanoic acid, neodecanoic acid, malonic acid, succinic acid, glutaric acid, adipic acid, pimelic acid, suberic acid, or any mixture thereof;
(c) the peroxygen stabilizing agent comprises 1-hydroxyethane-1,1-diphosphonic acid (HEDP), ethylenediaminetetraacetic acid (EDTA), glutamic acid diacetic acid (GLDA), methylglycine diacetic acid (MGDA), polymandelic acid, diethylenetriaminepentaacetic acid (DTPA), N-(hydroxyethyl)-ethylenediaminetriacetic acid (HEDTA), nitrilotriacetic acid (NTA), 2-hydroxyethyliminodiacetic acid (HEIDA), benzoic acid, aminobenzoic acid, citric acid, iminodisuccinic acid, polyaspartic acid, phosphoric acid, tripolyphosphate, amino tri(methylene phosphonic acid) (ATMP), diethylenetriaminepenta(methylene phosphonic acid), 2-hydroxy ethylimino bis(methylene phosphonic acid), ethylene diamine tetra(methylene phosphonic acid), hexamethylenediamine-tetra(methylene phosphonic) acid, or any mixture thereof;

(d) the anionic surfactant comprises C6-C24 alkylbenzene sulfonate, alkyl sarcosinate, C6-C24 olefin sulfonate, C6-C24 paraffin sulfonate, cumene sulfonate, xylene sulfonate, C6-C24 alcohol sulfates, C6-C24 alcohol ether sulfates having 1 to about 20 ethylene oxide groups, or any mixture thereof.

19. A diluted antimicrobial composition, obtained by diluting the antimicrobial composition of claim 17 with water.

20. A method of reducing the number of microbes on a surface, comprising:

applying an antimicrobial composition to the surface at a temperature ranging from about −20° C. to about 80° C. and at an atmospheric pressure of from about 0 PSI to about 50 PSI units, wherein the antimicrobial composition comprises peroxygen compound in an amount of from about 0.5% to about 16% by weight; C3-C6 N-alkyl-gamma-butyrolactam in an amount of from about 1% to about 25% by weight based on total weight of the composition, and optionally at least one of the following ingredients: water, peroxygen stabilizing agent different from the C3-C6 N-alkyl-gamma-butyrolactam, anionic surfactant, nonionic surfactant, amphoteric surfactant, cationic surfactant, solvent, pH adjusting agent, chelating agent, buffering agent, hydrotrope, skin conditioning agent, anti-foaming agent, additional antimicrobial agent, or any combination thereof, and the microbes comprise bacteria, viruses, fungi, yeasts, mycobacteria, fungal spores, bacterial spores, virinos, viroids, phages, prions, protozoa, parasites, or any combination thereof.

\* \* \* \* \*